US008221936B2

(12) United States Patent
Duffield et al.

(10) Patent No.: US 8,221,936 B2
(45) Date of Patent: Jul. 17, 2012

(54) METHOD AND APPARATUS FOR ATTACHMENT OF FUEL CELL STACK MANIFOLD

(75) Inventors: Michael Duffield, Medina, NY (US); Donald H. Keskula, Geneseo, NY (US)

(73) Assignee: GM Global Technology Operations LLC

( * ) Notice: Subject to any disclaimer, the term of this patent is extended or adjusted under 35 U.S.C. 154(b) by 917 days.

(21) Appl. No.: 11/106,095

(22) Filed: Apr. 14, 2005

(65) Prior Publication Data

US 2006/0234106 A1 Oct. 19, 2006

(51) Int. Cl.
*H01M 8/24* (2006.01)
*H01M 2/38* (2006.01)
*H01M 2/40* (2006.01)
*H01M 2/08* (2006.01)
*H01M 2/14* (2006.01)

(52) U.S. Cl. ........ 429/511; 429/452; 429/454; 429/458; 429/459; 429/507

(58) Field of Classification Search .................... 429/35, 429/36, 37, 38, 34, 511
See application file for complete search history.

(56) References Cited

U.S. PATENT DOCUMENTS

| 1,390,105 | A | * | 9/1921 | Erwin | 292/247 |
| 4,642,274 | A | * | 2/1987 | Tsutsumi et al. | 429/35 |
| 4,910,833 | A | * | 3/1990 | Barbour et al. | 24/68 CT |
| 5,374,026 | A | * | 12/1994 | Spurrier et al. | 249/61 |
| 6,372,372 | B1 | * | 4/2002 | D'Aleo et al. | 429/34 |
| 2005/0260479 | A1 | * | 11/2005 | Raiser et al. | 429/34 |

* cited by examiner

*Primary Examiner* — Barbara Gilliam
*Assistant Examiner* — Steven Scully
(74) *Attorney, Agent, or Firm* — Harness, Dickey & Pierce, P.L.C.

(57) ABSTRACT

A fuel cell system is provided which includes a mounting system for a manifold having a mounting plate. The fuel cell system also includes a fuel cell stack with a first end and a second end. The first end of the fuel cell stack includes at least one port in communication with the manifold. A clamping system is disposed on the second end of the fuel cell stack and is operable to engage the mounting plate of the manifold to couple the manifold to the fuel cell stack.

13 Claims, 4 Drawing Sheets

METHOD AND APPARATUS FOR ATTACHMENT OF FUEL CELL STACK MANIFOLD

FIELD OF THE INVENTION

The present invention relates to fuel cell systems, and more particularly, to a method and apparatus for attaching a fuel cell stack manifold.

BACKGROUND OF THE INVENTION

Fuel cell systems include a fuel cell stack that produces electrical energy based on a reaction between a hydrogen-based feed gas (e.g., pure hydrogen or a hydrogen reformate) and an oxidant feed gas (e.g., pure oxygen or oxygen-containing air). In proton exchange membrane (PEM) type fuel cells, the hydrogen-based feed gas is supplied to an anode of the fuel cell and an oxidant is supplied to a cathode of the fuel cell. PEM fuel cells include a membrane electrode assembly (MEA) comprising a thin, proton transmissive, non-electrically conductive, solid polymer membrane-electrolyte having the anode on one of its faces and the cathode on the opposite face. The MEA is sandwiched between a pair of electrically conductive elements which serve as current collectors for the anode and cathode and contain appropriate channels and/or openings therein for distribution of the fuel cell's gaseous reactants over the surfaces of the respective anode and cathode catalysts. A plurality of individual fuel cells are commonly stacked together to form a PEM fuel cell stack.

Generally, a PEM fuel cell stack includes six ports, three serving as the inlets, and three serving as outlets, one of each for the hydrogen-based feed gas, oxidant feed gas and coolant. Typically, an individual manifold is attached to each one of the ports for receipt of the respective fluid from that port, and each manifold is in turn coupled to another component in the fuel cell system. This results in cumbersome packaging which makes accessing the fuel cell stack difficult. Accordingly, a need exists for a manifold system which provides easier access to the fuel cell stack.

SUMMARY OF THE INVENTION

The present invention provides a fuel cell system including a manifold with a mounting plate. The fuel cell system also includes a fuel cell stack with a first end and a second end. The first end of the fuel cell stack includes at least one port in communication with the manifold. A clamping system is disposed on the second end of the fuel cell stack and is operable to engage the mounting plate of the manifold to couple the manifold to the fuel cell stack.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF VARIOUS EMBODIMENTS

The following description of various embodiments is merely exemplary in nature and is in no way intended to limit the invention, its application, or uses. Although the following exemplary description refers to the use of the present invention with a fuel cell stack in a vehicle, it will be understood that the principles embodied in the present invention may be applicable to other types of energy generation devices and to other components in a fuel cell system. In addition, the foregoing description is understood to not limit the appended claims.

Figure 1:
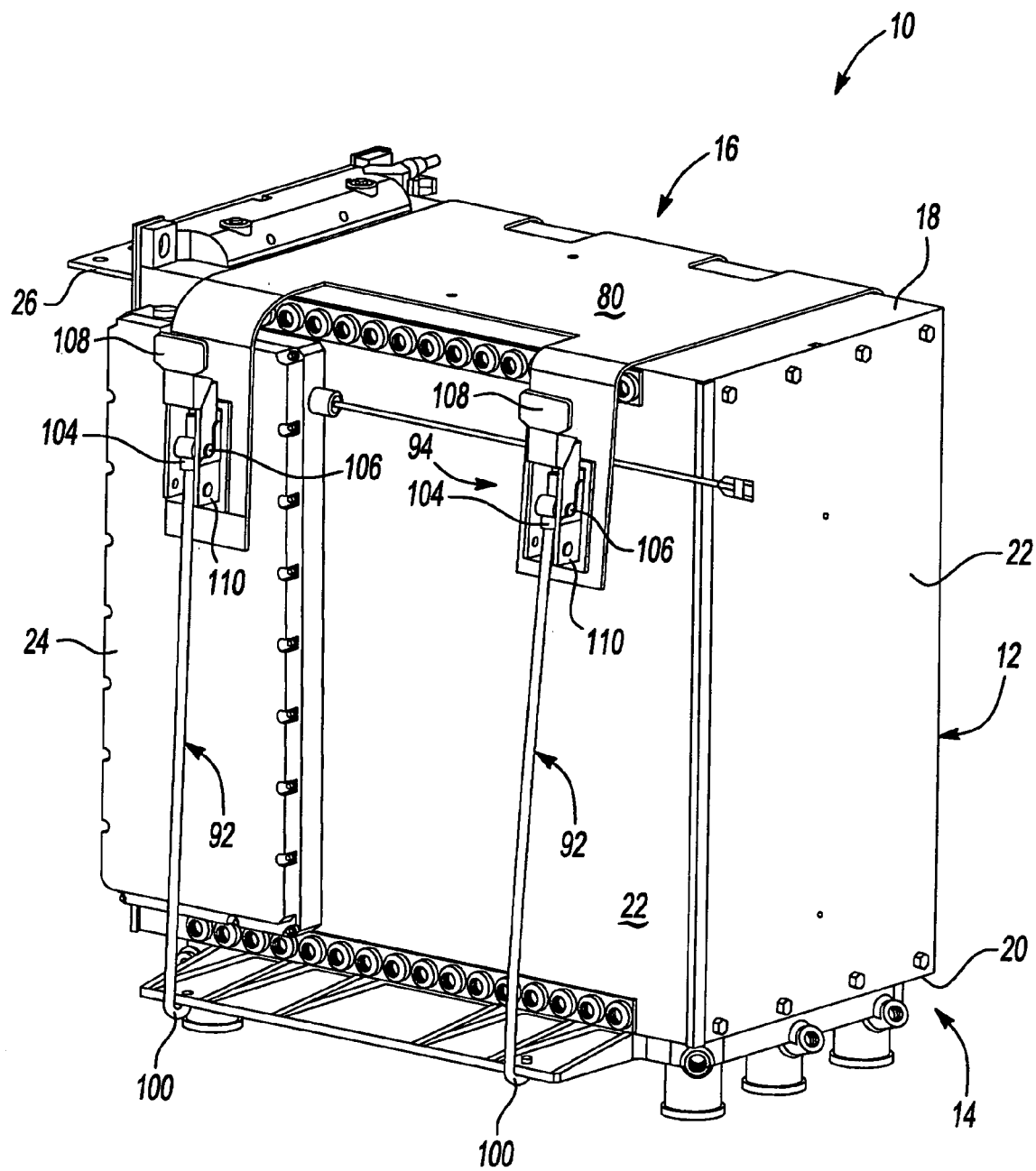
FIG. 1 is a perspective view of the manifold mounting system of the present invention according to various embodiments.
Figure 2:
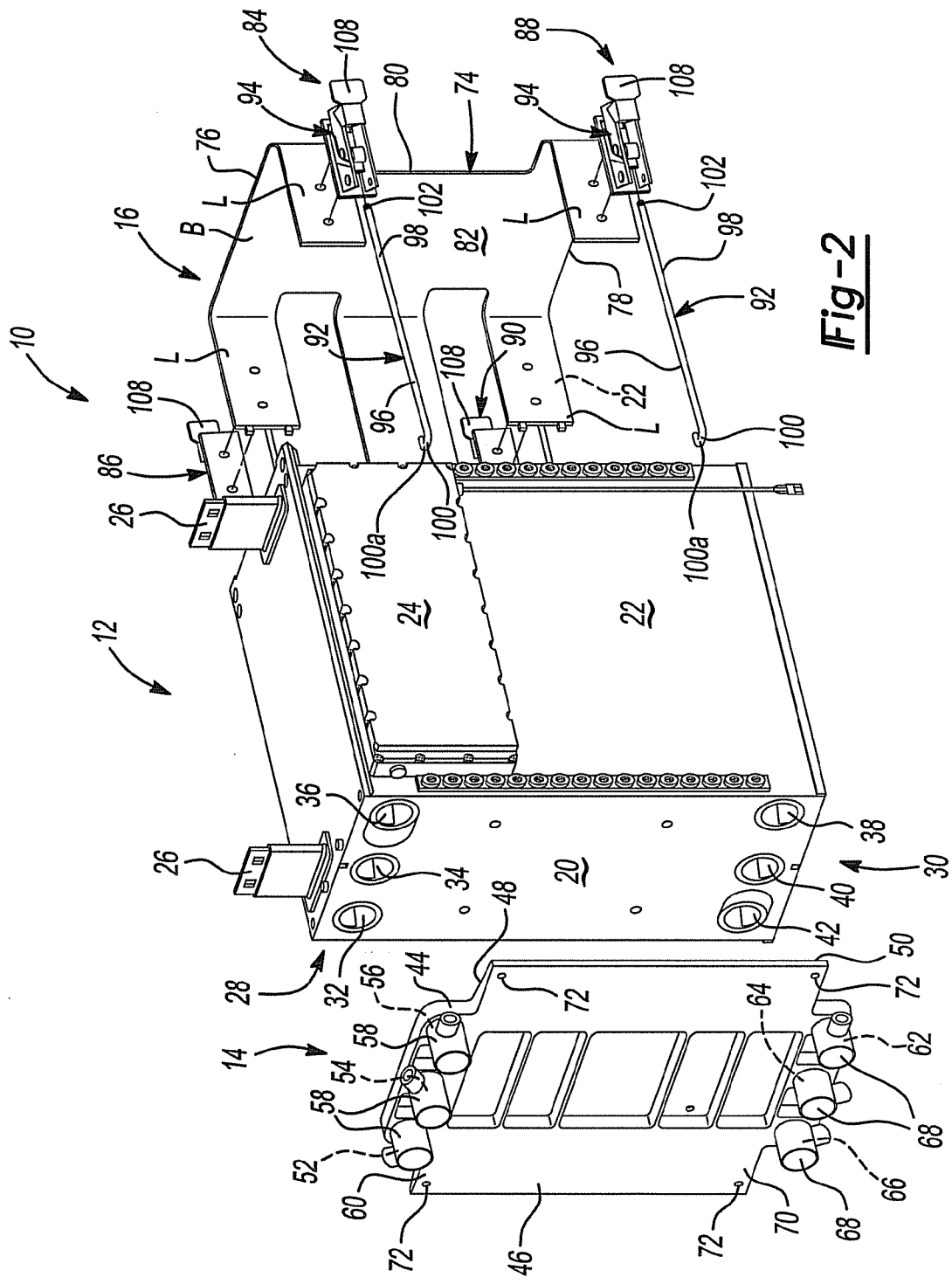
FIG. 2 is an exploded view of the manifold mounting system of FIG. 1.

Referring now to FIGS. 1 and 2, a fuel cell system 10 is shown. The fuel cell system 10 includes a fuel cell stack 12 (shown schematically) coupled to a manifold 14 via a clamping system 16. The fuel cell stack 12 has a top 18, a bottom 20 and a plurality of sidewalls 22. The fuel cell stack 12 may include a controller 24 mounted to the sidewall 22 and in communication with the fuel cell stack 12 to direct the operation of the fuel cell stack 12. The fuel cell stack 12 may also include a plurality of mounting brackets 26 extending from the sidewall 22 to couple the fuel cell stack 12, to a vehicle (not shown). Although the controller 24 and mounting brackets 26 are shown to be coupled to the sidewall 22 of the fuel cell stack 12, it should be understood that these components could be located at any suitable location on the fuel cell stack 12.

The bottom 20 of the fuel cell stack 12 may include a first side 28 and a second side 30. On the first side 28, the bottom 20 may include a first inlet 32, a second inlet 34, and a third inlet 36 for receipt of a feed gas, an oxidant gas and a coolant, respectively. The feed gas may be any type of gaseous substance which is capable of reacting with the oxidant gas in the fuel cell stack 12 to generate electricity, such as, for example, hydrogen or hydrogen reformate gas. The oxidant gas may comprise pure oxygen or oxygen-rich air, while the coolant may be any type of fluid capable of reducing the core temperature of the fuel cell stack 12. The second side 30 of the bottom 20 of the fuel cell stack 12 may include a first outlet 38, a second outlet 40, and a third outlet 42 for expelling the feed gas, oxidant gas and coolant, respectively, from the fuel cell stack 12. The feed gas, oxidant gas and coolant all enter and exit, the fuel cell stack 12 via the manifold 14.

The manifold 14 includes a top surface 44 and a bottom surface 46, which collectively form a mounting plate. The top surface 44 of the manifold 14 is configured to seal against the bottom 20 of the fuel cell stack 12. More specifically, the top surface 44 of the manifold 14 has a first side 48 and a second side 50. The first side 48 of the top surface 44 may include a first inlet 52, a second inlet 54 and a third inlet 56, each of the first inlet 52, second inlet 54 and third inlet 56 extending through the manifold 14 and coupled to a hose connector 58 disposed on a first side 60 of the bottom surface 46 of the manifold 14. The first inlet 52, second inlet 54 and third inlet 56 of the manifold 14 are adapted to be fluidly coupled to the first inlet 32, second inlet 34, and third inlet 36 of the fuel cell stack 12 when the manifold 14 is secured to the fuel cell stack 12, as will be discussed in greater detail below.

The second side 50 of the top surface 44 of the manifold 14 may include a first outlet 62, a second outlet 64 and a third outlet 66, each of the first outlet 62, second outlet 64 and third outlet 66 extending through the manifold 14 and coupled to a hose connector 68 disposed on a second side 70 of the bottom surface 46 of the manifold 14. Similarly, the first outlet 62, second outlet 64 and third outlet 66 are configured to be fluidly coupled to the first outlet 38, second outlet 40, and third outlet 42 of the second side 30 of the bottom 20 of the fuel cell stack 12. The manifold 14 generally is manufactured to a predetermined thickness to provide vibration isolation to the fuel cell stack 12. The manifold 14 may be manufactured out of any appropriate material, such as, for example, aluminum or steel.

The manifold 14 further defines a plurality of apertures 72. Generally, the corresponding first and second sides 48, 60, 50, 70 of the top surface 44 and bottom surface 46 of the manifold each define two apertures 72, however, any number of apertures 72 could be provided, and additionally, the location of the apertures 72 may vary as desired. The apertures 72 enable the clamping system 16 to secure the manifold 14 to the fuel cell stack 12.

The clamping system includes a saddle 74. As illustrated in FIG. 2, the saddle 74 can have a body B with a surface configured to mate with the top 18 of the fuel cell sack 12. A plurality of legs L can extend from the body B so as to be disposed over the top 18 of the fuel cell stack 12 at an angle relative to the body B of the saddle 74. The saddle 74 generally has a first side 76, a second side 78, a top surface 80 and a bottom surface 82. The first side 76 of the saddle 74 includes a first clamp mechanism 84 and a second clamp mechanism 86 which are each generally configured to mate with the first side 60 of the bottom surface 46 of the manifold 14. The second side 78 of the saddle 74 includes a third clamp mechanism 88 and fourth clamp mechanism 90. The third clamp mechanism 88 and fourth clamp mechanism 90 are generally configured to mate with the second side 70 of the bottom surface 46 of the manifold 14.

In one embodiment, the first, second, third and fourth clamp mechanisms 84, 86, 88, 90 each include a rod 92 and a clamp 94. The clamp 94 may be coupled to the saddle 74 via any suitable fastening mechanism, such as, for example, rivets, screws or bolts. The rod 92 includes a first end 96 and a second end 98. The first end 96 of the rod 92 includes a hook 100. The hook 100 of the rod 92 is configured to engage the corresponding aperture 72 in the bottom surface 46 of the manifold 14 such that only a portion 100a of the hook extends beyond the bottom surface 46 of the manifold 14. The second end 98 of the rod 92 is configured to mate with the clamp 94 to secure the manifold 14 to the fuel cell stack 12. Specifically, the second end 98 of the rod 92 includes a plurality of threads 102 configured to engage a threaded socket 104 on the clamp 94. The threaded socket 104 on the clamp 94 is pivotably attached via a pin 106 to a lever 108. The lever 108 is in turn pivotably coupled to a base 110, to enable the lever 108 to rotate with respect to the base 110. The base 110 of each clamp 94 is fixedly attached to the corresponding first side 76 or second side 78 of the saddle 74.

Figure 3:
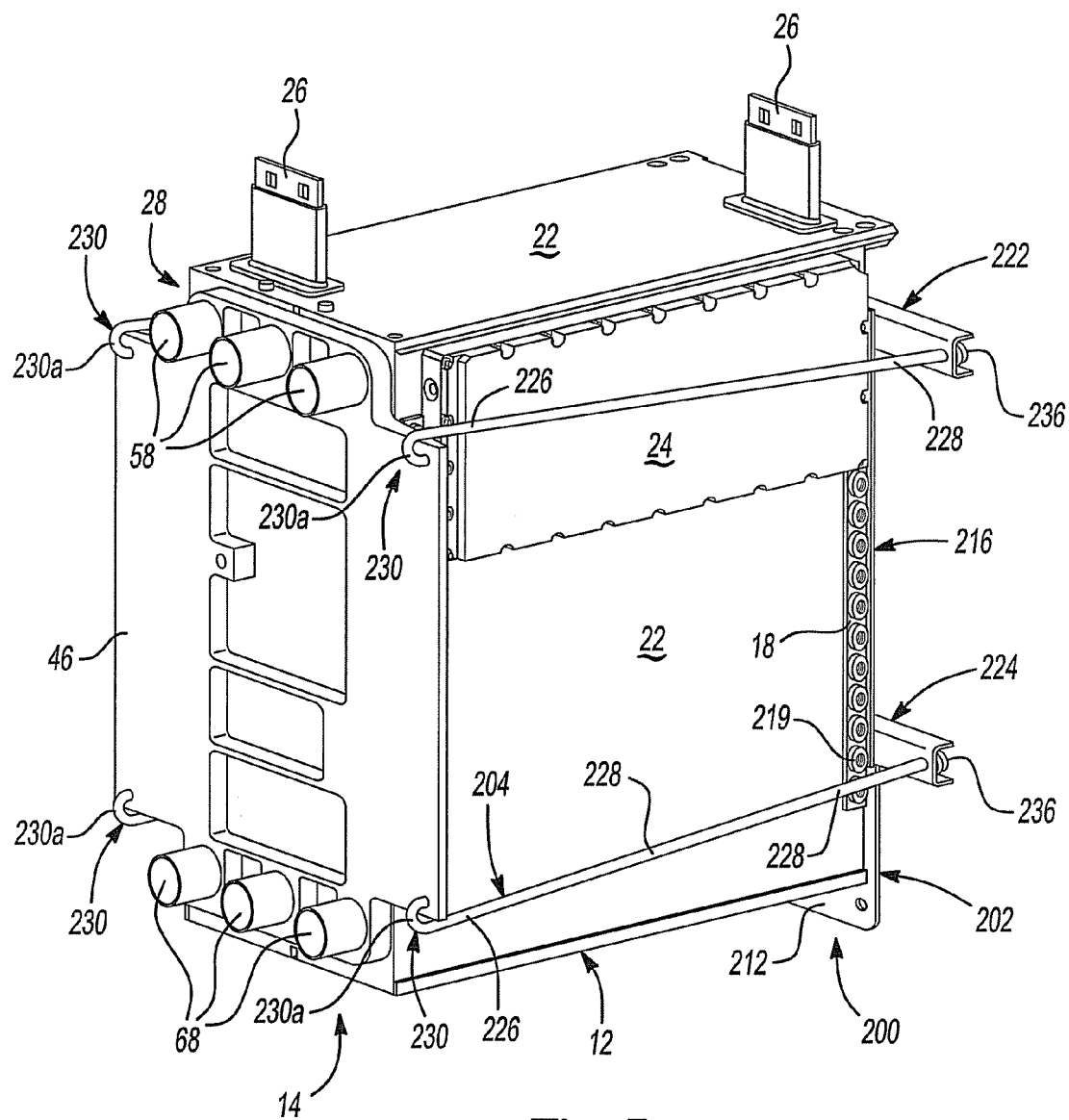
FIG. 3 is perspective view of the manifold mounting system of the present invention according to an alternative embodiment.
Figure 4:
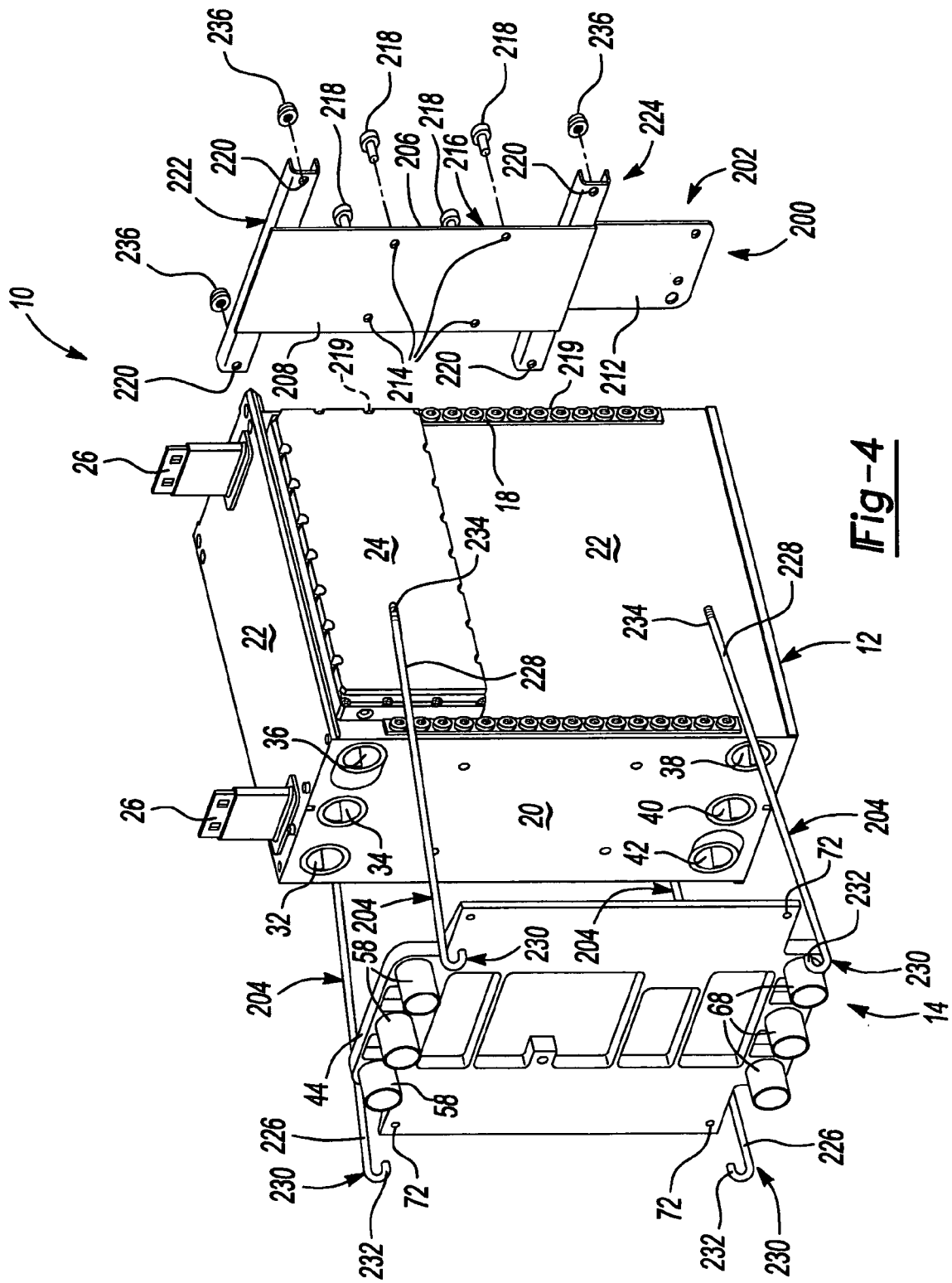
FIG. 4 is an exploded view of the manifold mounting system of FIG. 3.

Alternatively, with continuing reference to FIGS. 1 and 2, and with additional reference to FIG. 3, the fuel cell stack 12 can be attached to the manifold via a bracket system 200. Specifically, the bracket system 200 includes a support bracket 202 adapted to be releasably coupled to a plurality of rods 204. The plurality of rods 204 in turn are configured to releasably engage the plurality of apertures 72 defined in the manifold 14. In particular, the support bracket 202 includes a front surface 206 and a rear surface 208. The rear surface 208 is adapted to conform to the shape of the top 18 of the fuel cell stack 12 to enable the support bracket 202 to rest approximately flush against the top 18 of the fuel cell stack 12. The front surface 206 may be identical to the rear surface 208, or the rear surface 208 may include additional features, such as cut-outs to reduce the weight of the support bracket 202. The support bracket 202 may also include a flange 212 to couple the fuel cell system 10 to the vehicle (not shown).

Additionally, the support bracket 202 may define a plurality of apertures 214 to couple the support bracket 202 to the top 18 of the fuel cell stack 12. The plurality of apertures 214 may be located in a center 216 of the support bracket 202, however, any other position may be used. The plurality of apertures 214 may be configured to mate with a plurality of corresponding apertures 219 formed in the top 18 of the fuel cell stack 12. The plurality of apertures 219 in the fuel cell stack 12 are generally threaded for receipt of a threaded fastener 218 to couple the support bracket 202 to the fuel cell stack 12. However, any other suitable fastening mechanism, such as, for example, self tapping screws, adhesives or welding, may be employed.

The support bracket 202 also defines a second plurality of apertures 220 for receipt of the plurality of rods 204. Generally, the second plurality of apertures 220 are positioned on a first support bar 222 and a second support bar 224. The first support bar 222 and second support bar 224 are typically coupled to the front surface 206 of the support bracket 202, such that when the rear surface 208 of the support bracket 202 is adjacent to the fuel cell stack 12, the first support bar 222 and second support bar 224 are adjacent to the sidewall 22 of the fuel cell stack 12. The first and second support bars 222, 224 generally extend beyond the support bracket 202, however, the first and second support bars 222, 224 may be configured at any other length, and may be of different lengths. Typically, the first and second support bar 222, 224 each define two apertures 220, however, the first,. and second support bars 222, 224 could define additional apertures 220 as necessary to mate with the plurality of rods 204.

Each rod in the plurality of rods 204 includes a first end 226 and a second end 228. As each of the rods in the plurality of rods 204 is identical, the forgoing description will be as to one rod 204b of the plurality of rods 204. The first end 226 of the rod 204b includes a hook 230. The hook 230 of the rod 204b is configured to engage the corresponding aperture 72 in the manifold 14, such that an end 232 of the hook 230 is approximately flush with respect to the top surface 44 of the manifold 14. In other words, as illustrated in FIG. 3, the end 232 of the hook 230 can engage the corresponding aperture 72 such that a portion 230a of the hook 230 is the only portion of the clamping system 16 that extends beyond the bottom surface 46 of the manifold. The second end 228 of the rod 204b is adapted to mate with the apertures 220 in the first and second support bars 222, 224 to secure the manifold 14 to the fuel cell stack 12. Specifically, the second end 228 of the rod 204b includes a plurality of threads 234 configured to pass through the apertures 220 for receipt of a threaded fastener 236, such as, for example, a nut. In addition, other mechanical fasteners could be employed to secure the rod 204b to the first and second support bars 222, 224, such as, for example, a washer, locknut, wingnut, clips, or combinations thereof.

In order to attach the manifold 14 to the fuel cell stack 12, in one embodiment, the saddle 74 can be placed over the top 18 of the fuel cell stack 12. Next, the lever 108 can be rotated away from the base 110 of the clamp 94 to enable the pin 106 attached to the lever 108 and the threaded socket 104 to displace downward towards the manifold 14, thereby allowing the hooks 100 on the second end 98 of the rods 92 to engage the corresponding apertures 72 in the manifold 14. Next, the lever 108 can be rotated towards the base 110, causing the pin 106 and hence the threaded socket 104 to rotate upward, effectively sealing the manifold 14 to the fuel cell stack 12.

In an alternative embodiment, the fuel cell stack 12 can be attached to the manifold 14 by coupling each hook 230 of the rod 204 to the manifold 14 and inserting the second end 228 of each rod 204 through the apertures 220 on the first and second support bars 222, 224 of the support bracket 202. Next, threaded fasteners 236 can be threaded upon the threads 102 of the second end 228 of each rod 204 until the support bracket 202 and manifold 14 are sealed against the fuel cell stack 12.

It will be understood that various other similar techniques could be employed to seal the manifold 14 to the fuel cell stack 12, and thus the mechanisms described herein are not deemed to be limiting. Further, although the present invention describes the use of rods 92, 204, it will be understood that the rods 92, 204 could be bar stock, or straps adapted to function with the clamping system 16, and in addition, the saddle 74 could be comprised of a plurality of brackets (not shown) fixedly attached to the fuel cell stack 12.

The clamping system 16 of the present invention enables the inlet and outlet connections to be made to the manifold 14 without the fuel cell stack 12. present, which provides for simpler assembly of the fuel cell system 10. In addition, the clamping system 16 of the present. invention allows easy access to the fuel cell stack 12. and manifold 14 for servicing the fuel cell system 10 while enabling high density packaging. The present invention also reduces the cost and complexity of the fuel cell system 10.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel cell system comprising:
    an integrally formed manifold that defines a mounting plate and includes at least one inlet and at least one outlet the manifold defining a plurality of apertures;
    a fuel cell stack including a first end opposite a second end, the first end of the fuel cell stack including at least one port in communication with the manifold;
    a clamping system disposed on the second end of the fuel cell stack that engages the mounting plate of the manifold to couple the manifold to the first end of the fuel cell stack; and
    wherein the clamping system includes a saddle having a plurality of depending legs, the depending legs being positioned adjacent to and surrounding the fuel cell stack, and a plurality of rods each having a hook that engages a respective one of the plurality of apertures such that a portion of the hook is the only portion of the clamping system that extends beyond a surface of the manifold for coupling the manifold to the first end of the fuel cell stack, and further including a releasable clamp fixably coupled to one of said plurality of depending legs, the clamp including a pivoted lever coupled to the one of said plurality of legs and to one of the plurality of rods, the pivoted lever operable in a first position to secure the manifold to the fuel cell stack, and in a second position to release the manifold from the fuel cell stack.

2. The system of claim 1 wherein the saddle includes a first side and a second side, the saddle operable to be disposed on the second end of the fuel cell stack;
    a first clamping member disposed on the first side of the saddle, the first clamping member including a first rod of the plurality of rods operable to engage the mounting plate;
    a second clamping member disposed on the first side of the saddle, the second clamping member including a second rod of the plurality of rods operable to engage the mounting plate;
    a third clamping member disposed on the second side of the saddle, the third clamping member including a third rod of the plurality of rods operable to engage the mounting plate; and
    a fourth clamping member disposed on the second side of the saddle, the fourth clamping member including a fourth rod of the plurality of rods operable to engage the mounting plate.

3. The system of claim 2 wherein the first clamping member, second clamping member, third clamping member and fourth clamping member each further comprise:
    a clamp fixedly coupled to the saddle, the clamp including a lever coupled to a first end of each of the rods, the lever operable in a first position to secure the manifold to the fuel cell stack, and operable in a second position to release the manifold from the fuel cell stack.

4. The system of claim 3 wherein the mounting plate further includes a first side and a second side, the first side defining a first aperture for receipt of the hook from the second end of the first clamping member and a second aperture for receipt of the hook from the second end of the second clamping member, and the second side defining a third aperture for receipt of the hook from the second end of the third clamping member and a fourth aperture for receipt of the hook from the second end of the fourth clamping member.

5. A fuel cell system for a vehicle, the fuel cell system comprising:
    a fuel cell stack including a first end opposite a second end;
    a manifold coupled to the first end of the fuel cell stack, the manifold including at least one fluid inlet and at least one fluid outlet;
    a saddle coupled to the second end of the fuel cell stack, the saddle including a plurality of legs surrounding the fuel cell stack, each leg having a base pivotably coupled to a corresponding lever, wherein each lever is pivotably attached via a pin to a threaded socket; and
    a clamping system that includes a plurality of elongated members each having a first, rounded hook end releasably secured directly to the manifold and a second end releasably secured to the threaded socket such that the manifold is releasably coupled to the first end of the fuel cell stack via the plurality of elongated members of the clamping system and a portion of hook end of each of the plurality of elongated members is the only portion of the clamping system that extends beyond a surface of the manifold.

6. The system of claim 5 wherein the manifold further comprises a plurality of apertures operable to engage the first end of each of the plurality of elongated members.

7. The system of claim 6 wherein the second end of each of the plurality of elongated members includes a plurality of threads.

8. The system of claim 5, wherein the manifold is manufactured out of a metal.

9. A fuel cell system for a vehicle, the fuel cell system comprising:
    a fuel cell stack including a first end opposite a second end;

a manifold fluidly coupled to the first end of the fuel cell stack, the manifold including at least one inlet and at least one outlet;

a saddle having a body with a surface configured to mate with the second end of the fuel cell stack and a plurality of legs that extend from the body so as to surround and to be disposed over the second end of the fuel cell stack at an angle relative to the body; and a plurality of clamping members each having a first end coupled to a respective one of the plurality of legs of the saddle and a second end coupled to a portion of the manifold to releasably clamp the manifold to the first end of the fuel cell stack.

10. The system of claim 9 wherein the plurality of clamping members further comprises:

a first clamping member disposed on a first side of the saddle and coupled to a first leg of the plurality of legs of the saddle, the first clamping member operable to engage the manifold;

a second clamping member disposed on the first side of the saddle and coupled to a second leg of the plurality of legs of the saddle, the second clamping member operable to engage the manifold;

a third clamping member disposed on the second side of the saddle and coupled to a third leg of the plurality of legs of the saddle, the third clamping member operable to engage the manifold; and a fourth clamping member disposed on the second side of the saddle and coupled to a fourth leg of the plurality of legs of the saddle, the fourth clamping member operable to engage the manifold.

11. The system of claim 10 wherein the first clamping member, second clamping member, third clamping member and fourth clamping member each further comprise:

a rod including a first end and a second end, the second end including a hook for engagement with the manifold; and a clamp fixedly coupled to the saddle, the clamp including a lever coupled to the first end of the rod, the lever operable in a first position to secure the manifold to the fuel cell stack, and operable in a second position to release the manifold from the fuel cell stack.

12. The system of claim 11 wherein the manifold further includes a first side and a second side, the first side defining a first aperture for receipt of the hook from the second end of the first clamping member and a second aperture for receipt of the hook from the second end of the second clamping member, and the second side defining a third aperture for receipt of the hook from the second end of the third clamping member and a fourth aperture for receipt of the hook from the second end of the fourth clamping member.

13. The system of claim 12, wherein a portion of each of the hooks is the only portion of the clamping system that extends beyond a surface of the manifold.

* * * * *